Nov. 24, 1953  D. W. SHERMAN  2,660,477
PRESSED STEEL TRUCK WHEEL
Filed Jan. 23, 1950  2 Sheets-Sheet 1
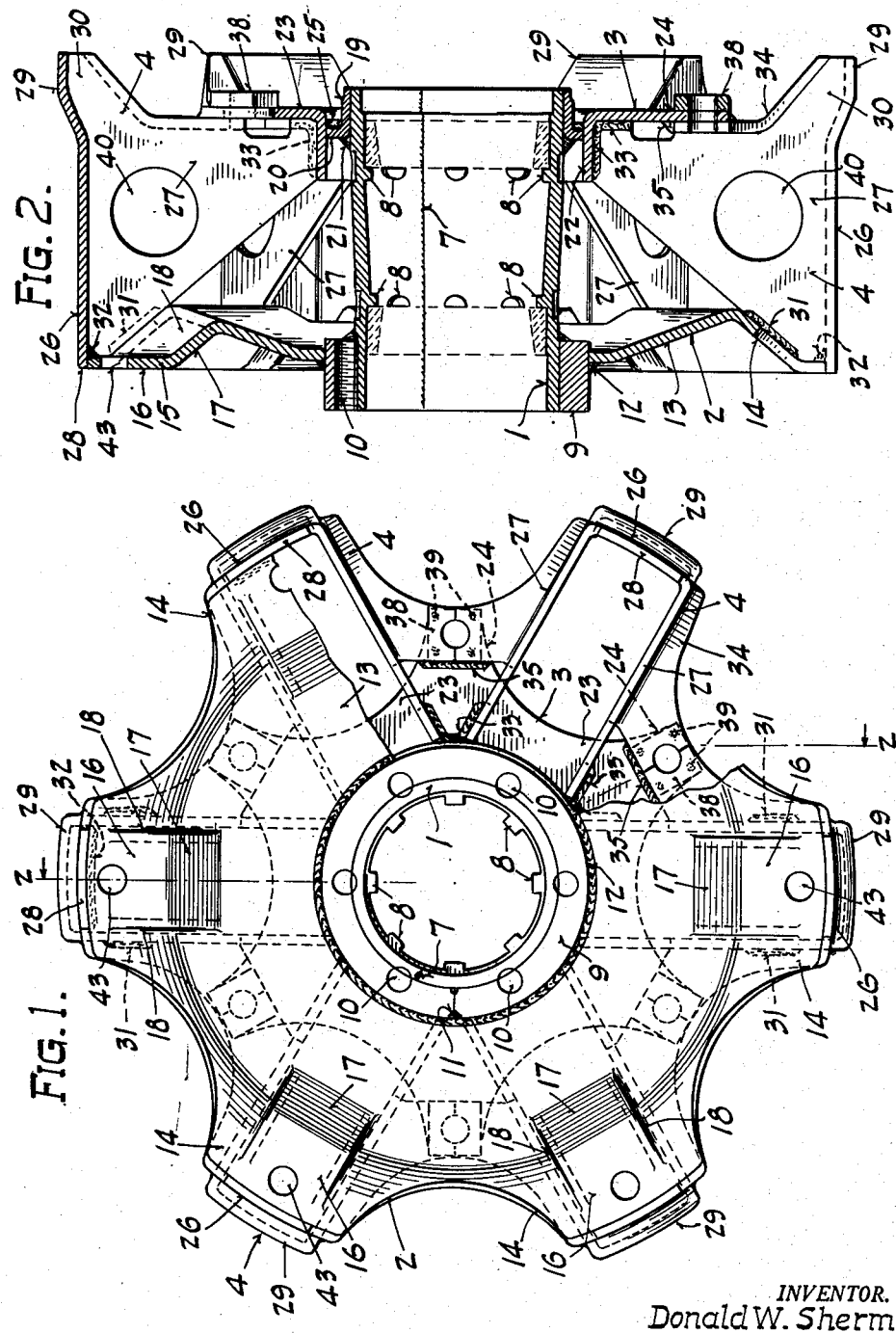
INVENTOR.
Donald W. Sherman
BY
ATTORNEYS.

Nov. 24, 1953  D. W. SHERMAN  2,660,477
PRESSED STEEL TRUCK WHEEL
Filed Jan. 23, 1950  2 Sheets-Sheet 2

INVENTOR.
Donald W. Sherman
BY Andrus & Scales
ATTORNEYS.

Patented Nov. 24, 1953

2,660,477

UNITED STATES PATENT OFFICE 2,660,477

PRESSED STEEL TRUCK WHEEL

Donald W. Sherman, Milwaukee, Wis., assignor to A. O. Smith Corporation, Milwaukee, Wis., a corporation of New York Application January 23, 1950, Serial No. 140,107

8 Claims. (Cl. 301—13)

This invention relates to a pressed steel dual wheel for use on trucks and trailers and the like.

An object of the invention is to provide a pressed steel truck wheel which is relatively light in weight, yet is sufficiently strong to support heavy trucks and withstand hard use in service.

Another object of the invention is to provide a wheel the component parts of which may be pressed from flat stock and assembled with a minimum of machining and waste material.

Another object of the invention is to provide a pressed steel wheel having a semi-truss type spoke and web construction of light weight, yet capable of withstanding substantial axial forces.

Another object of the invention is to provide a dual truck wheel wherein the hub member may be formed of inexpensive flat stock instead of being made of tubing, or of a forging or casting.

In general, the wheel structure comprises a cylindrical hub portion, an outer web member apertured for circumferential welding to a ring on the hub portion, a relatively small inner web member axially spaced from the outer web and welded to a second ring on the hub portion, and a plurality of circumferentially spaced spokes welded between the outer and inner webs and shaped at their outer faces to receive a pair of tire rims. Brace portions are provided on the spokes and welded to the inner web to aid in the transmission of torque from the hub to the rim. The projecting portions of the outer web are provided with holes to receive the bolts for lugs which hold the tire rims in position, while the corresponding projecting portions of the inner web are similarly apertured for insertion of the brake drum bolts.

Other objects and advantages will be set forth more fully in the following description of an embodiment of the invention as illustrated in the accompanying drawings.

In the drawings:

Figure 1 is a front elevation of the wheel with portions broken away to show details of structure;

Fig. 2 is a section taken along line 2—2 of Fig. 1;

Figure 3:
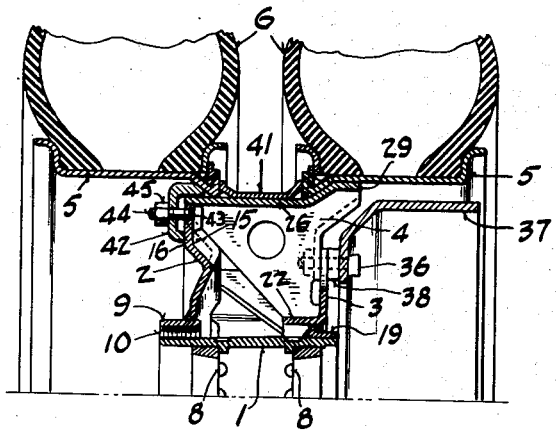
Fig. 3 is a vertical section showing a portion of the wheel as assembled with a pair of tires and tire rims.

Referring to the drawings, there is shown a wheel comprising in general a hub portion 1, an outer web member 2, an inner web member 3, and a plurality of channel-shaped spokes 4 interposed between the web members 2 and 3 in a strong semi-truss arrangement. The spokes 4 serve to receive a pair of tire rims 5 and tires 6 as will be described subsequently.

The hub 1 is formed from flat stock into a generally cylindrical shape and is broached to form a tight seam for welding as at 7. Seats for bearing races are provided in the form of two axially displaced sets of circumferentially spaced buttons 8 which extend inwardly from the interior surface of the hub 1.

The buttons 8 are preferably extruded from flat stock before the forming of hub 1. After forming, the buttons 8 are cut to semi-circular cross-section when the hub is machined.

In order to provide a relatively heavy member through which torque may be transmitted to the wheel from a truck driving axle assembly, not shown, a driving ring 9 is circumferentially welded at its inner edge to the outer end of the hub 1. The driving ring 9 is provided with a plurality of radially spaced axially extending holes 10 which are threaded to receive the bolts of the truck driving axle assembly.

Where the wheel is employed on a trailer axle or other non-driving axle, smaller holes 10 may serve to receive bolts to hold a hub cap in position.

The driving ring 9 is preferably formed from bar stock, with the ends broached after forming and welded together as at 11. After the driving ring 9 is welded to hub 1, the holes 10 may be drilled primarily in the ring 9 but partially in hub 1, so that a portion of each hole 10 comprises a groove in the hub 1 as shown in Fig. 1.

The outer web member 2 is pierced at its center for girth welding at 12 to the exterior surface of the driving ring 9. The web 2 comprises a dished center portion 13 which extends inwardly and radially from the ring 9, and a plurality of spaced projecting portions 14 formed integral with the center portion 13. The projecting portions 14 extend outwardly and radially from the center portion 13 and give the periphery of the web 2 a scalloped appearance.

Figure 4:
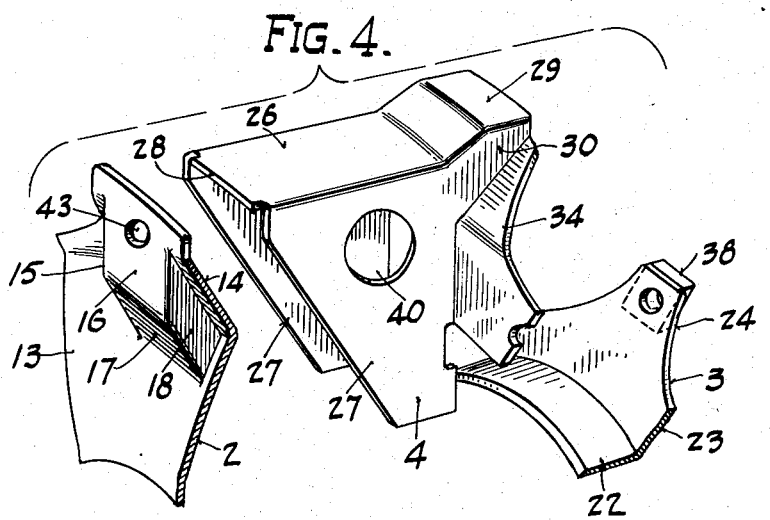
Fig. 4 is an exploded detail perspective view showing fragments of the outer and inner webs as related to a spoke member.

As best shown in Fig. 4, each of the projecting portions 14 is preferably constructed for maximum strength with an integral outwardly protruding portion 15. Each portion 15 is shaped with a vertical rectangular front face 16, an inwardly sloping rectangular lower face 17, and a pair of side faces 18.

The web 2 is formed first by blanking and piercing a steel plate, then by pressing the same to the desired shape. These operations are performed with sufficient accuracy to eliminate the necessity of machining the large external circumference of the wheel after the assembly thereof.

Local thickening of the inner end of the hub 1 is desirable in order to provide surfaces for welds capable of withstanding substantial shear loads. Accordingly, a ring 19 having a radially extending flanged portion 20 is secured to the exterior surface of the hub 1 by means of a circumferential fillet weld 21.

The ring 19 may be manufactured, for economy of material, from the disc-shaped piece of steel plate resulting from the piercing operation in the manufacture of the outer web 2.

The inner web member 3 is relatively smaller than the outer web 2 and comprises a cylindrical center portion 22, an integral radially extending annular portion 23 which merges with the center portion 22, and a plurality of spaced radially projecting portions 24 formed integral with the outer circumference of the annular portion 23.

In order to rigidly secure the web 3 to the ring 19, a weld 25 is made in a groove bounded by the exterior surface of the ring 19, the flanged portion 20 of ring 19, and the interior surface of the cylindrical portion 22 of web 3.

The projecting portions 24 of inner web 3 are circumferentially displaced from the projecting portions 14 of the outer web 2 so that the angles formed between adjacent projecting portions 14 of the outer web 2 are bisected by the projecting portions 24 of the inner web 3.

The channel-shaped spokes 4 are pressed from steel plate and are spaced radially of the hub 1 between the outer web 2 and the inner web 3. Each spoke 4 comprises a peripheral face 26 and a pair of generally triangular integral side faces 27. The face 26 is provided at its outer end with a lip 28 which fits over the corresponding projecting portion 14 of the outer web 2, and at its inner end with a radially and axially extending flared portion 29 which acts as a seat for a tire rim 5. The flared portion 29 is strengthened by a protrusion 30 formed integral therewith and with the side faces 27.

The corners of the triangular side faces 27 which are opposite the protrusions 30 are shaped, respectively, to abut the projecting portions 14 of the outer web 2, and the cylindrical portion 22 and annular portion 23 of the inner web 3.

The spokes 4 are rigidly secured to the outer web 2 by welds 31 disposed between the side faces 27 of the spokes 4 and the projecting portions 14 of the outer web 2, so that the welds 31 straddle the recesses formed by the angularly protruding portions 15 of the projections 14. In addition, interior welds 32 are made between the periphery of the outer web 2 and the inner surfaces of the lips 28.

Spokes 4 are secured to inner webs 3 by welds 33 located between cylindrical portion 22 and annular portion 23 of the inner web 3 and the abutting side faces 27 of the spokes 4. For added rigidity and to transmit torque from hub to rim, a pair of brace flanges 34 is provided on each spoke 4 and welded at 35 to the interior surfaces of the projections 24 of the inner web 3.

Figure 5:
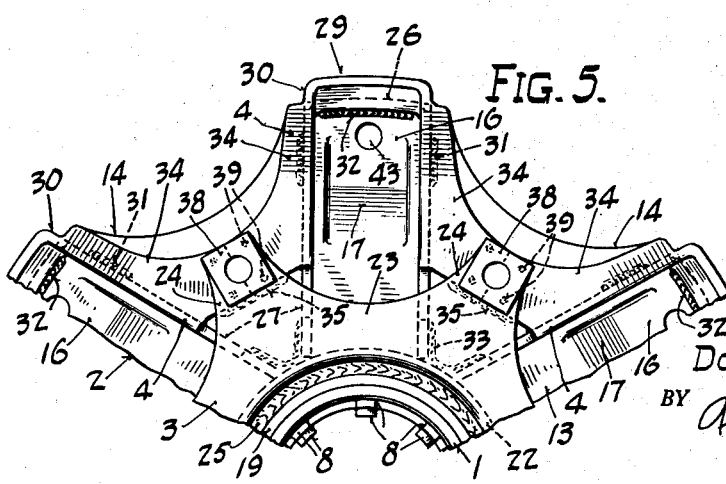
Fig. 5 is a fragmentary rear elevation of the wheel.

Referring to Fig. 4, flanges 34 are formed integral with the protrusions 30 and with the adjacent edges of the spoke sides 27. Corresponding flanges 34 of adjoining spokes 4 extend towards each other, as shown in Figs. 1 and 5, so that the ends thereof are contiguous at a projection 24.

The projections 24 and the end portions of the related flanges 34 are apertured to receive bolts 36 which secure a brake drum 37 to the inner side of the wheel. To provide bearing area and machining stock for the brake drum 37, a square washer 38 is welded, for example by projection welds 39, to the exterior surface of each projection 24.

To lighten the spokes 4, holes 40 may be provided in the center of each side face 27.

In assembling the tire rims 5 and tires 6 on the wheel, the inner rim 5 is first positioned over the flared portions 29 and a spacer ring 41 is placed adjacent thereto. The outer rim 5 is next assembled and held in place by a plurality of lugs 42 each of which is shaped to engage both the outer rim 5 and the front face 15 of the projection 15.

The projecting portions 14 of the outer web 2 have apertures 43 to receive lug bolts 44. The bolts 44 serve, together with their corresponding nuts 45, to hold lugs 42, tire rims 5, and spacer ring 41 securely in position against the flared portion 29 of the wheel.

In assembling the basic parts of the dual wheel, the driving ring 9 and the thickening ring 19 are welded to the hub 1, and the outer web 2 is welded to the driving ring 9. The spokes 4 are then welded to the inner web 2, and the combined spoke and inner web assembly is positioned on the thickening ring 19 and welded thereto at 21. Welds 31 and 32 may then be made to attach the spokes 4 to the outer web 2 and complete the assembly.

The design of the parts is such that they can be accurately produced by rapid blanking, pressing, and forming operations. Because of the accuracy of these operations, no intermediate machining steps are required for assembly purposes and no machining of the external circumference of the wheel is necessary. The cost of manufacturing the wheel, as compared to ordinary truck wheels, is therefore reduced and the speed of assembly is increased.

The truss-like spoke portions are such that the wheel is capable of withstanding substantial side and radial forces. Consequently, the wheel may be made of relatively light parts while at the same time maintaining the strength features of a heavier wheel.

The use of pressed steel parts, instead of forgings or castings, results in a strong and lightweight wheel which may be manufactured with a minimum of waste material.

Various embodiments of the invention may be employed within the scope of the accompanying claims.

I claim:

1. In a pressed steel wheel assembly for use with the tire rims of trucks and trailers and the like, a cylindrical hub member, a pair of axially spaced pressed steel web members disposed on said hub member, and a plurality of radially disposed pressed steel spoke members welded between said web members in truss relation, said spoke members having outer faces shaped to provide support for said tire rims and having generally triangular side faces extending inwardly to the region of said hub member for increased support of the wheel against collapse under side loadings.

2. In a dual wheel assembly for use with the tire rims of a vehicle, a cylindrical hub member formed from flat stock and longitudinally welded, a pair of rings welded to the outer surface of said hub member to strengthen the same, a pair of axially spaced web members welded to the corresponding rings, and a plurality of channel-shaped spoke members welded between said web members and extending radially of said hub for substantially the entire distance between said hub and said tire rims, said spoke members being partially flared at their outer faces to provide seating surfaces for said tire rims and having relatively large side faces shaped to support said seating surfaces.

3. A dual truck wheel comprising a cylindrical hub member, a driving ring disposed at the outer end of said hub member, a pressed steel outer web member welded to said driving ring and extending radially therefrom for substantially the entire distance from said driving ring to the outer circumference of said wheel, an axially displaced inner web disposed on said hub member and formed relatively smaller than said outer web member, and a plurality of circumferentially spaced pressed steel spoke members welded between said outer and inner web members in truss relation, said spoke members having flared portions disposed outwardly of said inner web to seat a tire rim and relatively large side faces adapted to reinforce said flared portions and prevent collapse of said webs under side loadings.

4. A dual truck wheel for use with the tire rims of trucks and trailers and the like, comprising a hub, an outer web welded at the outer end of said hub and having a plurality of spaced outwardly projecting portions at its outer circumference, an inner web welded at the inner end of said hub and formed relatively smaller than said outer web with a like number of outwardly projecting portions, said inner web being circumferentially offset from said outer web so that the projecting portions of said inner web bisect the angles formed between adjacent projecting portions of said outer web, and a plurality of channel-shaped spokes welded to the projecting portions of said outer web and extending therefrom for welding to the inner portions of said inner web, with portions of the outer surfaces of said spokes being flared to provide seating surfaces for said tire rims.

5. A pressed steel truck wheel comprising a cylindrical hub, a ring welded at the outer end of said hub, an outer web welded to said ring and having a plurality of circumferentially spaced projecting portions at its outer circumference, a flanged ring welded to the inner end of said hub, a circumferentially offset inner web welded to said flanged ring and formed relatively smaller than said outer web with a like number of outwardly projecting portions, a plurality of spokes welded between said outer and inner webs and shaped at their outer surfaces to receive the tire rims of a truck or the like, a plurality of brace members extending from said spokes and welded to the projecting portions of said inner web, a plurality of lugs secured to the projecting portions of said outer web to hold said tire rims on said wheel, and a brake drum secured to the projecting portions of said inner web.

6. A pressed and welded truck wheel comprising a cylindrical hub member formed from flat stock and longitudinally welded, a plurality of extruded buttons disposed on the interior surface of said hub to provide seats for the bearing races of a truck axle assembly, a ring welded at the outer end of said hub and apertured to receive the bolts of said truck axle assembly, a pressed steel outer web welded to said ring and having a plurality of circumferentially spaced projecting portions at its outer circumference, a flanged ring welded to the inner end of said hub, a relatively small flanged inner web welded to said flanged ring and having a like number of outwardly projecting portions circumferentially offset from the projecting portions of said outer web, a plurality of pressed steel channel-shaped spokes welded between said outer and inner webs and shaped at their outer surfaces to receive the tire rims of a truck, a plurality of brace portions formed integral with said spokes and welded to the projecting portions of said inner web, a plurality of lugs bolted to the projecting portions of said outer web and shaped to hold said tire rims on said wheel, and a brake drum bolted to the projecting portions of said inner web.

7. A dual truck wheel for use with the tire rims of a truck, comprising a cylindrical hub, axially spaced outer and inner webs welded at the ends of said hub, the outer web being relatively larger than said inner web and extending radially of said hub for substantially the entire distance to said tire rims, a plurality of channel-shaped circumferentially spaced spokes welded between said outer and inner webs and substantially radially coextensive with said outer web, said spokes having flared portions disposed outwardly of said inner web to seat a tire rim, and a plurality of brace members formed integral with said flared portions and welded to said inner web to aid in the transmittal of torque from said hub to said tire rims.

8. A dual truck wheel comprising a cylindrical hub member, driving means for the wheel provided at the outer end of said hub member, a pressed steel outer web member welded to said driving means and extending radially therefrom for a substantial distance, an inner web axially displaced from the outer web and welded to said hub member, said inner web being relatively smaller than said outer web member, and a plurality of circumferentially spaced pressed steel spoke members welded between said outer and inner web members in truss relation, said spoke member having flared portions disposed outwardly of said inner web to seat a tire rim and generally large side faces adapted to reinforce said flared portions and prevent collapse of the webs under side loadings.

DONALD W. SHERMAN.

References Cited in the file of this patent

UNITED STATES PATENTS

| Number | Name | Date |
|---|---|---|
| 1,393,795 | Lachman | Oct. 18, 1921 |
| 1,441,005 | Ledwinka | Jan. 2, 1923 |
| 1,828,162 | Swain | Oct. 20, 1931 |
| 2,088,442 | Sanchez | July 27, 1937 |
| 2,339,859 | Hunt | Jan. 25, 1944 |
| 2,427,378 | Ash | Sept. 16, 1947 |
| 2,478,803 | Ash | Aug. 9, 1949 |
| 2,491,150 | Ash | Dec. 13, 1949 |
| 2,492,967 | Clark | Jan. 3, 1950 |

FOREIGN PATENTS

| Number | Country | Date |
|---|---|---|
| 611,461 | Great Britain | Oct. 29, 1948 |